June 2, 1953 T. A. FEENEY 2,640,466
FOLLOW-UP TYPE PRESSURE FLUID SERVOMOTOR
Filed July 8, 1952 3 Sheets-Sheet 1
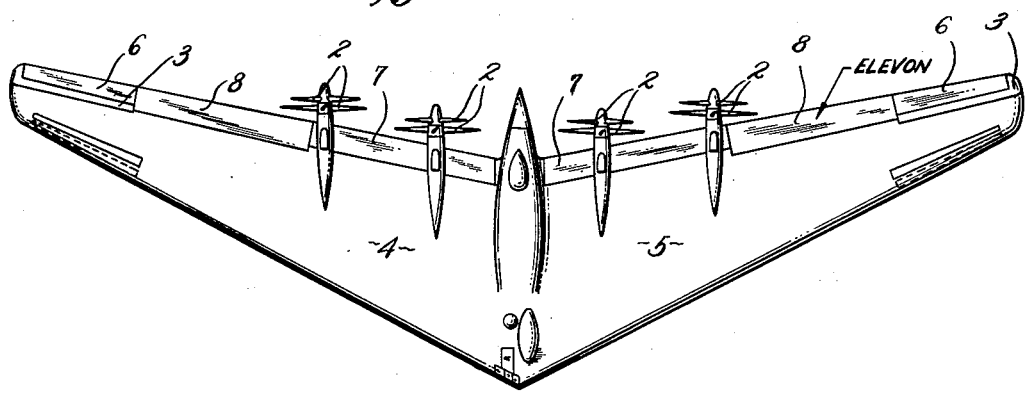
Fig. 1
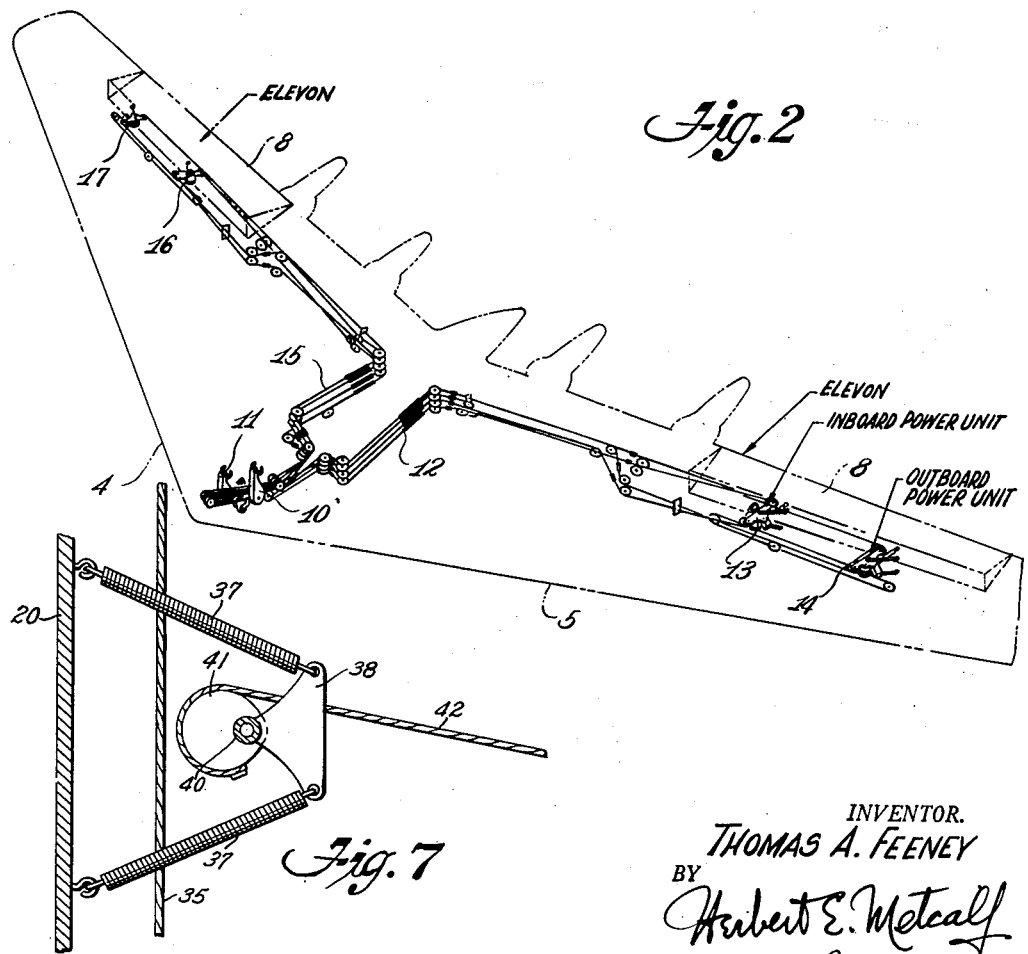
Fig. 2
Fig. 7
INVENTOR.
THOMAS A. FEENEY
BY Herbert E. Metcalf
Attorney

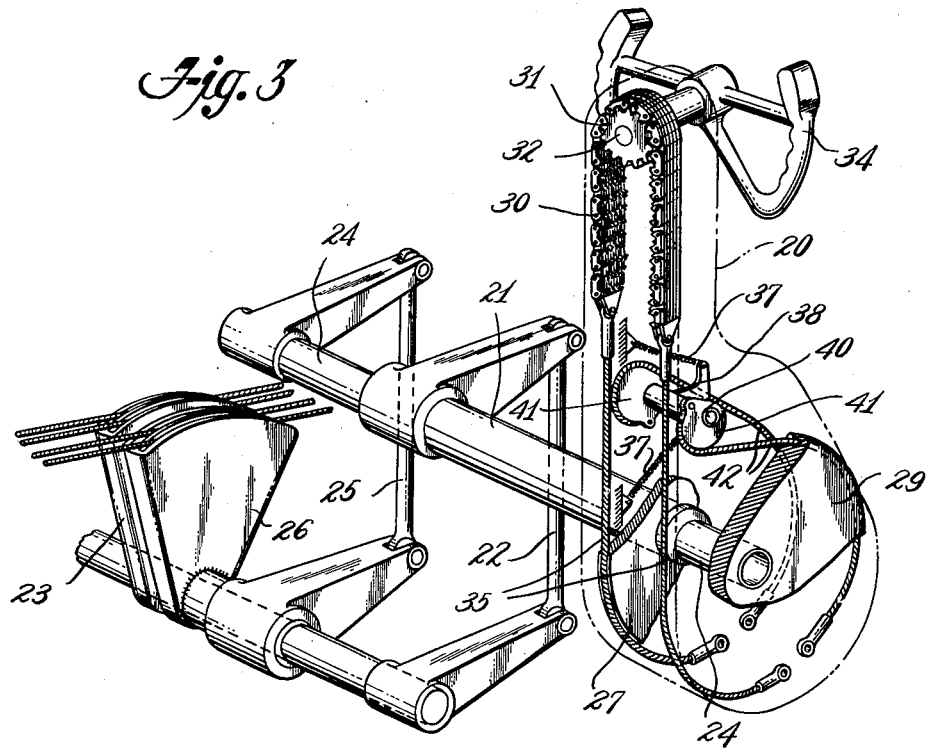
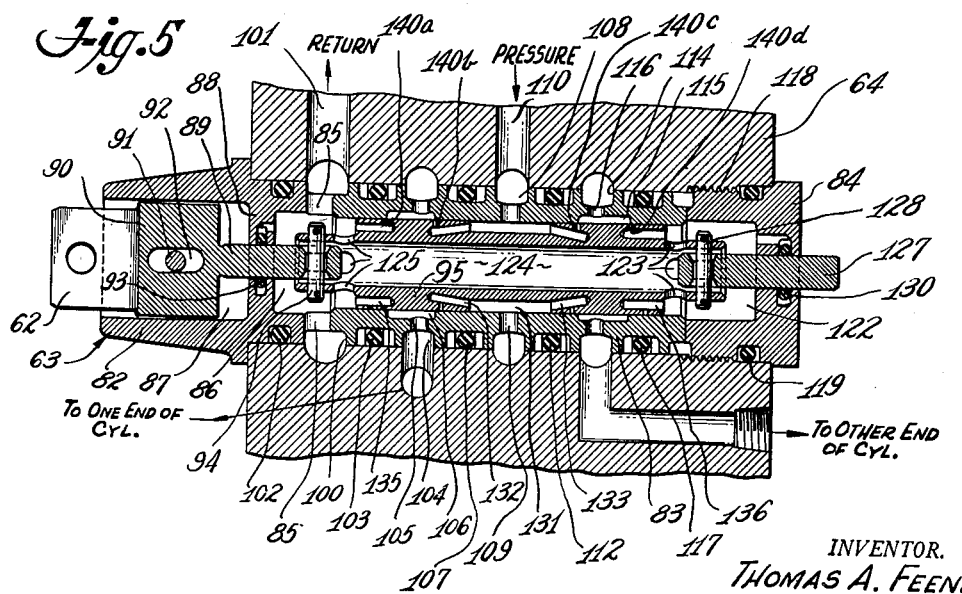
INVENTOR.
THOMAS A. FEENEY
BY
Herbert E. Metcalf
Attorney

June 2, 1953  T. A. FEENEY  2,640,466
FOLLOW-UP TYPE PRESSURE FLUID SERVOMOTOR
Filed July 8, 1952  3 Sheets-Sheet 3

INVENTOR.
THOMAS A. FEENEY
BY
Herbert E. Metcalf
Attorney

Patented June 2, 1953

2,640,466

UNITED STATES PATENT OFFICE 2,640,466

FOLLOW-UP TYPE PRESSURE FLUID SERVOMOTOR

Thomas A. Feeney, Los Angeles, Calif., assignor to Northrop Aircraft, Inc., Hawthorne, Calif., a corporation of California Application July 8, 1952, Serial No. 297,725

8 Claims. (Cl. 121—41)

The present invention relates to full powered airplane controls and, more particularly, to a means and method of controlling large airplane control surfaces under power only, by a minimum exertion of force by the pilot of the airplane. This application is a continuation-in-part of my copending application, Serial No. 23,567, filed April 27, 1948, now abandoned.

In U. S. application, Serial No. 681,890, filed July 8, 1946, now Patent No. 2,582,348, Northrop and Feeney have described and claimed certain control surfaces suitable for all-wing airplanes, notably, those used on the U. S. Army bombers designated as the XB–35 and YB–49. These controls were shown to be full power operated under pilot control, and, as far as is presently known, the XB–35 and YB–49 airplanes are the first large airplanes to be successfully flown with full power operation of all control surfaces, although such power operation was extensively flight tested in smaller all-wing prototype of the XB–35, known as the N–9–M, prior to use in the XB–35. The N–9–M airplanes are believed to be the first airplanes of any type flown with full powered controls.

The full powered surface controls of the XB–35 bomber are hydraulically operated under the application of minimum stick force by the pilot, without control surface feed-back or feel being transmitted to the pilot, and the present invention has for an object the provision of a means and method of obtaining full power operation of large airplane control surfaces, such as those used in the XB–35 and YB–49 for example, or in other large airplanes of the more conventional type.

The XB–35 and YB–49 airplanes are, even for today, very large airplanes, having a maximum gross weight of around 202,000 lbs., with a wing span of 172 ft. and a length of 53 ft., the only difference between the two designs being a substitution of jet engines in the YB–49 for the reciprocating engines of the XB–35. Certain control surfaces of these airplanes, such as the elevons, for example, have an area of 382 sq. ft. each. With one elevon on each wing panel, these surfaces are moved together for pitch and climb control and separately for roll control. Thus the pilot is required to move 764 sq. ft. of control surface at speeds of 400 M. P. H. or greater. It has been calculated that the pilot would have to exert a control force under certain circumstances in flight of over 8,000 lbs. in order to move these surfaces for proper flight control if the surfaces were to be controlled manually without power boost. Such forces are, of course, highly impractical if not impossible to achieve manually.

The use of large control surfaces has led, in some instances, to the use of power boost systems where the pilot supplies part of the force necessary to move the control surfaces, with a power source supplying the remaining force, in order that the pilot force be within reason. The power boost may be of two types. The control surfaces may be made to be nearly aerodynamically balanced in various positions away from neutral, the air stream supplying a portion of the force opposing movement of the surface; or a power unit such as a hydraulic motor may be applied to the surface to provide a force necessary to augment the pilot applied force. In both cases, force is transmitted back to the pilot from the control surfaces, this force providing what is known as pilot "feel" of the aerodynamic forces built up on the control surface, and this feedback force must be overcome by the pilot.

The first of these expedients increases aerodynamic drag of the control surfaces while the second involves complicated structure tending to increase weight and to cause hunting of the control surfaces. It is an object of the present invention to provide a means and method of operating airplane control surfaces under full power without transmitting force back to the pilot and with a simple mechanical unit that has minimum hunting characteristics.

With full power operation of the control surfaces, the applied pilot force need only be nominal, and it is another object of the present invention to provide a full power operated airplane surface control where the force applied by the pilot for operation thereof, is of negligible importance, irrespective of the actual force required to move the control surface.

Ailerons, elevators, rudders and/or elevons are usually attached as part of the trailing edge of a lifting surface, such as the wing panels in all-wing airplanes, or on the horizontal or vertical stabilizers in fuselage type airplanes. Some of these surfaces develop an aerodynamic response substantially linear with respect to control surface movement away from neutral. It is another object of the present invention to provide a means and method of obtaining full power operation of large airplane control surface in which the control surface movement is substantially linearly related to pilot initiated control movements, in order that the aerodynamic response be substantially linearly related to the pilot initiated control movements.

However, certain types of control surfaces used on airplanes do not have an aerodynamic response that is linearly related to control surface movements. Examples of this latter type of control surface are spoilers erected from the upper surface of the wings to provide aileron control, and split rudders for providing drag near the wing tips to produce turning moments. Both of these types of controls require a substantial surface displacement from a neutral position before a significant aerodynamic response is obtained. Accordingly, it is another object of the present invention to provide a full powered pilot operated system wherein the aerodynamic response of movement of such control surfaces as just above described is made to be substantially linearly related to piloting movements of the pilot's control element.

Other objects and advantages of the present invention will be apparent from a description of the appended drawings in which:

Figure 1 is a diagrammatic plan view of one form of airplane to which the present invention may be applied.

Figure 2 is a diagram of the cable and motor assembly used to move the elevons of the airplane shown in Figure 1.

Figure 3 is a perspective view of a pilot's control column connected for elevon control.

Figure 5 is a longitudinal sectional view showing a servo-valve construction suitable for use in the power unit of Figure 4.

Figure 7 is an enlarged fragmentary sectional view illustrating details of the wheel-centralizing means shown in Figure 3.

Figure 4:
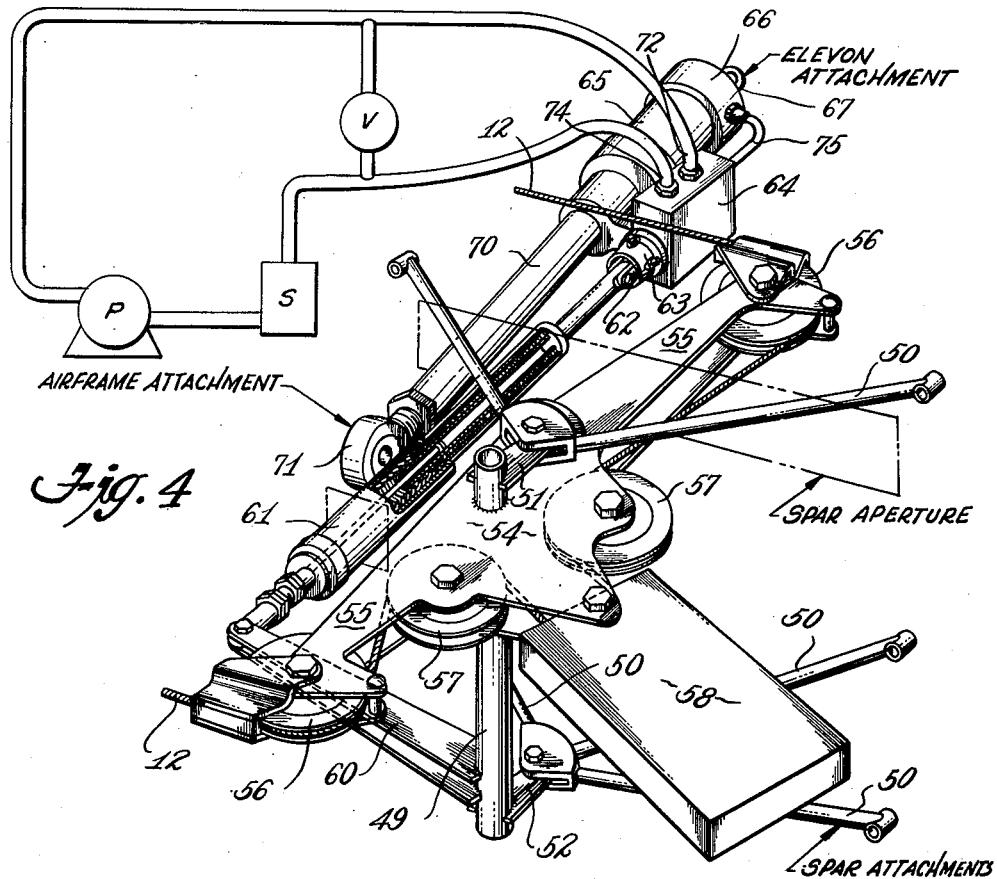
Figure 4 is a perspective view of one preferred form of hydraulic motor power unit used for full power control of the elevons on the airplane of Figure 1.

Referring first to Figure 1, the all-wing airplane shown diagrammatically is the XB-35, having four reciprocative motors within the airplane driving pusher propellers 2 and having a wing spread of 172 ft. with a length of 53 ft. The controls for this airplane comprise outer trim flaps 3 on each wing panel 4 and 5, having separable drag rudders 6 mounted thereon, inner landing flaps 7 and intermediate elevons 8. All of these control surfaces are full power operated by the pilot with no pilot force whatever being applied to the control surfaces, and the present invention will be described as applied to the power plants used for full power operation of the elevons and drag rudders.

The elevon control is shown diagrammatically in Figure 2. Here the pilot's control column 10 and co-pilot's column 11 are interconnected and then connected by cables 12 to the left elevon motors, there being preferably two, an inboard power unit 13 and an outboard power unit 14 connected to move the left elevon. Similarly, cables 15 connect the control columns with a right inboard power unit 16 and a right outboard power unit 17. These power units are connected to be operated in parallel on each elevon, and the elevons are operated together in the same direction for elevation control and in opposite directions for aileron type control, thus giving rise to the term elevon. The elevons can be moved in this manner, for example, by the construction of the control column as shown in Figure 3, which will next be briefly described.

A control column casing as indicated by broken line 20 is mounted on a composite shaft comprising an outer tube 21 connected by linkage 22 to one cable quadrant 23, and an inner shaft 24 connected by another linkage 25 to another cable quadrant 26. Inside casing 20, a tube drum 27 is mounted on tube 21 and a shaft drum 29 is mounted on shaft 24, these drums being of the same diameter and cut away in the figure for clarity. A chain 30 is driven by a sprocket 31 on one end of wheel shaft 32, the wheel shaft 32 extending out of casing 20 with a wheel 34 mounted thereon.

The ends of chain 30 are connected to chain cables 35, one passing about halfway around tube drum 27 and then being fixed thereto, the other passing similarly around shaft drum 29. Thus when wheel 34 is rotated, opposite motion of cable quadrants 23 and 26 are obtained, and when the casing is rocked forward or aft, both quadrants will move together for elevator type control. Opposed springs 37 are attached to the casing 20 and to levers 38 attached to centering shaft 40 which has end drums 41 thereon connected on opposite sides to centering cables 42, one of which passes around drum 27 and the other around drum 29, to be affixed thereto. Opposed springs 37 provide forces centralizing wheel 34 in a predetermined neutral position. The centralizing system for elevator movement of the column is not shown but may be similar to that described above, or may be of a type applying an aerodynamic feel from a bellows actuated primarily by an air flow separate from the controlled surface, for example, as shown, described and claimed in the Ashkenas application, Serial No. 567,683, filed December 11, 1944, now Patent No. 2,559,817.

I refer next to Figure 4, which shows in perspective view an installation of a hydraulic motor as used to operate an elevon. A vertical axle 49 is placed within a wing panel, for example, and pivoted to wing spar attachments 50 at each end thereof respectively, by short bellcrank arms 51 and 52 respectively. Above, axle 49 carries a pulley plate 54 extended to cross arms 55 carrying end pulleys 56 over which run control cables 12 operated by the pilot from the control column 10 or 11. Cables 12 pass around tension box pulleys 57 to enter a cable tensioning box 58 attached to the pulley plate 54, as is well known in the art. Rotation of axle 49 by the pilot moves long bellcrank arm 60 which is attached to a spring loaded valve operating rod 61 that is expansible and contractible under a predetermined overload, passing through an aperture in the wing spar to link directly with a valve spool attachment 62.

Valve spool attachment 62 enters a valve assembly 63 inserted in a valve block 64 securely fastened to one end of a hydraulic motor cylinder 65, the other end 66 of cylinder 65 being attached to an elevon operating arm (not shown) by elevon attachment 67. A hydraulic piston rod 70 enters cylinder 65 opposite elevon attachment 67 and is attached to the airframe by wing attachment fitting 71. Piston rod 70 is, as is well known in the art, attached to a hydraulic piston (not shown) inside of cylinder 65.

Valve block 64 is provided with a hydraulic fluid pressure inlet 72 and a fluid return pipe 74. The piston rod end of the cylinder 65 is supplied with fluid through the valve block, and the closed end of the cylinder is supplied through the block and through outside pipe 75.

There are several preferred requirements for the operation of the valve assembly 63, namely, there should be a neutral leakage in the valve with a restricted flow increasing as the valve spool moves away from neutral, the valve should provide a preload on both sides of the piston to resist movement of the surface away from neutral due to air shock, and the valve should be sensitive, thereby permitting the pilot to make small corrective movements of the control surface. Several types of valve can satisfy these requirements and one of them will be described in detail herein, as shown in Figure 5. This particular valve is shown, described and claimed by Parker in a co-pending application, Serial No. 17,624, filed March 29, 1948.

In Figure 5, valve assembly 63, one end of which projects from valve block 64 in Figure 4, comprises a spool casing adapted to be fastened into valve block 64 and an inner spool to be moved by valve operating rod 61. The spool casing starts at the left of the figure, with a hollow spool slide end 82 followed by a barrel portion 83 of uniform outer diameter to terminate in a threaded end 84.

The inner terminus of slide end 82 is provided with opposed ports 85 entering a return chamber 86 which is separated from a slide chamber 87 in this end by a partition 88 bored out to pass a spool rod 89 attached outside of partition 88 to a slide 90, in turn attached to valve spool attachment 62. Slide 90 is held to a fixed travel by a slide pin 91 attached to slide end 82. This pin passes through elongated hole 92 in the slide 90. A spool rod packing 93 is installed in partition 88. Spool rod 89 is attached by spool pin 94 to a spool 95 sliding inside of the spool casing. Spool pin 94 is in line with opposed ports 85 for easy assembly. Spool 95 will be described later.

On the outside of the spool casing, communicating with opposed ports 85, is a return fluid groove 100, which, when the valve assembly is in place in valve block 64, communicates with fluid return pipe 74 on the valve block through return bore 101. An outer slide end packing seal 102 isolates return fluid groove 100 from the outside of the valve block.

To the right of the return fluid groove 100 is an outer ring seal 103 separating outer fluid return groove 100 from one cylinder chamber groove 104 having circumferential cylinder ports 105 therein communicating with inner cylinder chamber groove 106 facing the spool 95. Another outer ring seal 107 follows, then an outer pressure fluid groove 108 communicating with the interior of the spool casing without an inner groove by pressure ports 109.

The outer pressure fluid groove 108 connects through valve block 64 with pressure inlet 72 through pressure bore 110.

Next is still another ring seal 112 followed by a second outer cylinder chamber groove 114 connecting with an inner second cylinder chamber groove 115 by circumferential return ports 116. A fifth ring seal 117 follows. Next comes the threaded end 84 with threads 118 sealed from the outside by threaded end ring seal 119.

Threaded end 84 is provided with a threaded end return fluid chamber 122 connecting with slide end return chamber 86 by threaded end ports 123, through a central spool bore 124 and slide end ports 125. These latter ports 125 connect with return groove 100, bore 101, and then return pipe 74.

Both ends of spool 95 are exactly alike, the spool being attached at the threaded end to a spool idler rod 127 by idler pin 128. Idler rod 127 passes through the threaded end 84 and is sealed by idler rod seal 130 mounted in the threaded end. As the exposed areas at each end of spool 95 are the same, no piston effect is applied by the return fluid pressure.

Opposite pressure ports 109 leading to outer pressure fluid groove 108, the spool is cut away to form a circumferential fluid distributing groove 131 extending equal distances, when the spool is in neutral position, on each side of pressure ports 109. This distributing groove 131 is provided with sides normal to the surface of the bore in which the spool slides, and a plurality of circumferentially distributed pressure bores 132 and 133 extend longitudinally in the spool wall from respective sides of the pressure distributing groove 131 a sufficient distance to terminate beyond the near sides of inner first and second cylinder chamber grooves 106 and 115 in the spool casing.

Both ends of the spool 95 are also cut away opposite return chambers 86 and 122 to form shoulders which also have circumferentially spaced return bores 135 and 136 extending longitudinally into the spool 95 past the opposite sides of the inner first and second cylinder chamber grooves 106 and 115 respectively.

The spool construction is completed by four sets 140a, 140b, 140c, and 140d of a circumferentially arranged series of flow holes bored normal to the peripheral surface of the spool and entering the various bore holes 135, 132, 133 and 136 respectively. These flow holes are bored with definite axially staggered patterns with respect to the various inlets and outlets of casing and spool. These flow holes are used to pass all the liquid flow through the valve, as slide pin 91 limits the travel of the spool to less than the travel required to open pressure groove 131 on the spool to either of the inner cylinder chamber grooves 106 or 115.

In Figure 5, the spool is shown in neutral position. The flow hole of each of the sets 140b and 140c nearest to the pressure inlet is arranged to be partially covered by the more central shoulders of cylinder grooves 106 and 115, respectively. The flow hole of each of the sets 140a and 140d nearest the ends of the spool is also partially covered by the outer shoulders of return flow grooves 106 and 115, respectively. Thus, in neutral position, a small flow is constantly applying pressure to both ends of cylinder 65 through the two partially covered flow holes 140b and 140c. The fluid then leaks to the return through flow holes 140a and 140d.

In one preferred form of valve, a constant pressure of 2000 p. s. i. is used in pressure inlet 72 and the partially covered holes are proportioned to provide a pressure drop of 1000 p. s. i. through each hole. In this form, the neutral leakage flow holes may be .015″ in diameter and are each located so as to be substantially bisected in neutral position by the shoulders of the grooves 106 and 115. In consequence, there is at all times, in the neutral spool position, a preload of 1000 p. s. i. on both sides of the cylinder piston, thus preventing motion of the attached control surface under shock conditions.

In another form of the valve for use with a 2800 p.s.i. constant pressure system, the neutral leakage flow holes may be about .013″ in diameter but are located so as to be almost entirely covered, when in neutral position, by the shoulders of the grooves 106 and 115 in order to proportion the neutral leakage flow restrictions to provide pressure drops of 1400 p. s. i. therethrough. Hence, in neutral, a preload of 1400 p. s. i. is applied to both sides of the cylinder piston. In still another form for use with a 1000 p. s. i. constant pressure system, the neutral leakage flow holes may be .015" in diameter and located so as to be slightly more than bisected by the groove shoulders in neutral in order to provide pressure drops of 500 p. s. i. for a corresponding piston preload.

In all of these forms, the constant inlet pressure is obtainable from a constant pressure system provided in any conventional manner, as for example, by a diagrammatically shown pump P fed from a pump S and having a relief valve V connected to a return line and set to provide the desired constant pressure, i. e. 1000 p. s. i., 2000 p. s. i., 2800 p. s. i., etc.

A minute movement of the spool of only about .007" in the case of the use of .015" neutral leakage flow holes, given in the first example, will close the normally bisected flow holes on one side of the spool and open the other normally bisected holes. Then, fluid flow to one side of the piston will be made at a highly restricted rate as determined by the pressure and hole diameter so that the piston moves very slowly. Further motion of the spool will uncover more holes in the patterns on one side of the spool and close those on the other so that an increasing, but still restricted, flow will be obtained to move the piston faster.

In example given above of a 2000 p. s. i. constant pressure system, neutral flow rate of about .02 G. P. M. is provided as the holes are bisected. Then, as the spool is moved so that all the holes in one set are completely open with the holes of the opposite completely closed in both pressure and return channels, the flow rises to a maximum flow of about 2 G. P. M. with the spool moved in either direction, with a spool travel less than the stroke of valve operating rod 61.

In the preferred form of motor shown in Figure 4, valve spool rod is spring loaded in both directions. This rod, under all normal circumstances, acts as a solid rod as far as the operation of the valve is concerned, but as the spool travel in this preferred construction is about .015" in either direction and the quadrant travel may be several inches, it might be possible for the pilot to operate his control column faster than the cylinder and piston could move the connected control surface. If this should happen, the spool would have full pilot force applied thereagainst, if rod 61 were solid. By springing this rod in both directions to permit change in length of about 50% of the quadrant travel, the spring load can be made so that when the rod lengthens or contracts, only a safe force is applied to the valve spool and block if the rate of pilot movement of the control is greater than the rate of response of the hydraulic motor. This spring loaded rod also permits full operation of one motor unit when the valve spool of the other motor unit is jammed, and prevents damage to the valve spools if the pilot's control element is operated without hydraulic pressure on the cylinder piston.

In operation, it will be noted that as the cylinder is attached to the elevon operating arm and the piston rod to the wing, and as the valve and valve block is attached to the cylinder, with the valve operating rod 61 coming from the wing, no mechanical feed-back link is needed. With the valve operating rod 61 in neutral position, the elevon is held in neutral position by the preload mentioned above. When the valve operating rod 61 is moved away from neutral by the pilot, the spool is moved and fluid is admitted to one or the other sides of the piston, with the opposite side of the piston open to the fluid return. The cylinder then moves in accordance with the pressure application, and the elevon is moved. As the elevon moves, however, the valve also moves as it is attached to the cylinder but the spool does not, as it is held in position by the pilot. When the neutral point of the spool within the valve is reached, the elevon movement stops, having moved away from neutral in accordance with pilot control movement. Thus, the cylinder and, consequently, the elevon will follow all pilot initiated movement of the valve operating rod 61. The extremely short feed-back circuit created by the attachment of the valve to the cylinder with cylinder moving with the elevon efficiently prevents hunting.

As the cylinder and valve casing are both attached to the elevon and move with it, the follow-up movement of the cylinder and valve casing is equal to the initiating movement of the valve spool by the pilot. As the aerodynamic response of elevon movement is substantially linearly related to movement of the elevon, it is clear that in this construction, the aerodynamic response will be substantially linearly related to movement of the pilot's control.

In certain types of airplanes, such as the all-wing airplane shown in Figures 1 and 2, it is desirable to employ drag type rudders to achieve directional control, because of the absence of a tail section for mounting a conventional rudder. Such drag rudders may take the form of hinged flaps simultaneously opened to project both above and below the trailing edge of the wing, preferably near the tips thereof. Using such a split-flap rudder, a linear relation between pilot's rudder pedal movement and rudder surface separation does not provide a linearly related amount of aerodynamic response. Instead, there must be a relatively large movement of the rudder surfaces near the closed position to obtain a small aerodynamic response, changing into a small surface movement near the full open position for a large response. Since it is desired to provide a linear relation between rudder pedal movement and aerodynamic response, a biased feed-back system is desirable for operation of the rudder surfaces. Such a motor unit is shown diagrammatically in Figure 6.

Full power operation of the rudder is accomplished by the pilot, operating, through a conventional cable control system from rudder pedals (not shown), the hydraulic servo valve, preferably of two power units, as in the aileron control above described, which govern the opening and closing of the rudder flaps. In order that each rudder pedal position will correspond to a definite surface position, a follow-up rod driven by the rudder is used to shut off the servo valve when the correct surface separation is reached. The relation between rudder pedal displacement and surface movement is made non-linear by the fact that one end of the follow-up describes a circular arc, while the other end traces a straight line, identical in part to the motion of a connecting rod between a piston and crankshaft.

Figure 6:
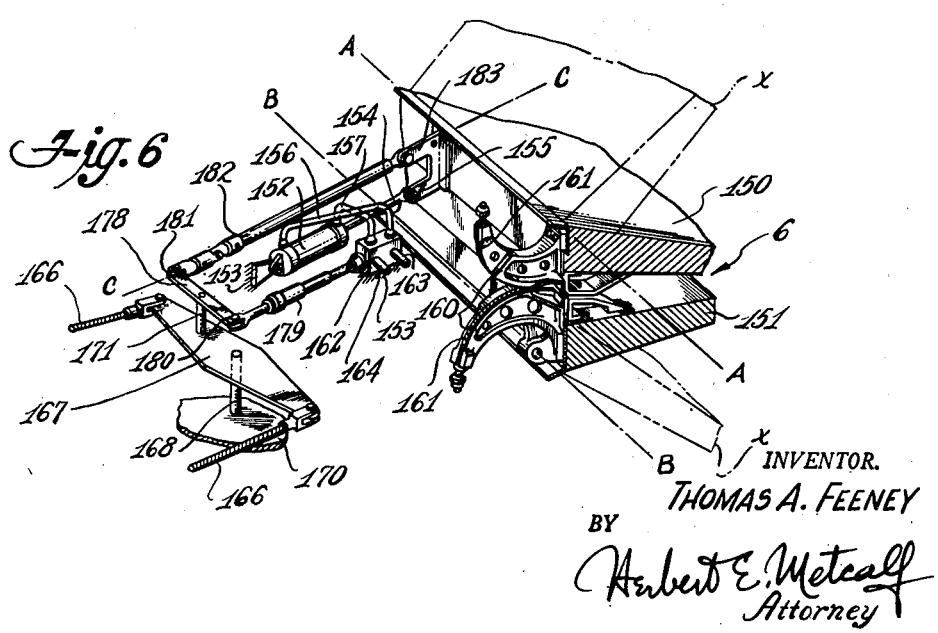
Figure 6 is a perspective diagram of a motor unit suitable for rudder operation.

In Figure 6, showing one motor unit only, each rudder 6 consists of two panels or flaps 150 and 151, one mounted on top of the other along the trailing edge of trim flap 3 (Figures 1 and 2), with their forward edges hinged to the trim flap 3 along axes A and B respectively, so that when they are operated, one will rotate upwardly and the other will rotate downwardly, assuming the position indicated by the dotted lines X. The upper rudder flap 150 is rotated about its hinge line A by the action of a hydraulic rudder cylinder 152, the forward end of which is anchored to the aircraft structure 153. A piston rod 154 projects aft from the cylinder 152 and attaches to an operating arm 155 mounted on the upper rudder 150. The other end of the piston rod 154 is connected to the customary piston (not shown), enclosed in the rudder actuating cylinder 152.

Hydraulic supply and return lines 156 and 157 are connected to the cylinder 152 on opposite sides of the enclosed piston, so that fluid pressure may be made to extend or retract the piston rod 154 and thereby operate the upper rudder flap 150.

Two opposing quadrants 160 are installed in back-to-back relationship, one on the upper rudder flap 150 and one on the lower rudder flap 151. Crossed cables 161 are then connected, each with one end attached to the forward end of each quadrant 160, and the other end attached to the aft end of each quadrant, to cause the lower rudder 151 to operate from the upper rudder 150, but in the opposite direction. The hydraulic supply and return lines 156 and 157 connect to a rudder servo valve 162 which controls the actuating cylinder 152. Also connected to the servo valve 162 is a hydraulic pressure supply line 163 and a return line 164 from the airplane's hydraulic system. As in the previous embodiment, a valve spool is provided, which, by its position within the valve 162, determines which of the cylinder lines 156 or 157 is pressurized, or which, in the neutral position, applies a leakage pressure to both cylinder lines 156 and 157. The body of the servo valve 162 is held to the aircraft structure 153, while the valve spool is free to slide, within limits, in or out of the servo valve. The entire servo valve 162 may be similar to the example previously described except that it is attached to the aircraft structure instead of to the actuating cylinder. In addition, due to an increased airload, it may be desirable to have fluid flow in the rudder valves approximately twice that used in the elevon valves.

Two rudder control cables 166 from one of the pilot's rudder pedals connect, one, to each end of a cable lever 167 pivoted on a support shaft 168 midway between the ends. This support shaft 168 is mounted on a bracket 170 firmly attached to the aircraft structure 153. A link pin connection 171 is provided on the cable lever 167, between shaft 168 and one of the cable attachments. To the link pin connection 171, a valve feedback link 178 is rotatably attached, approximately at its midpoint, above the cable lever 167. One end 180 of the valve link 178 is connected by a spool rod 179 to the valve spool, this connection to link 178 being at a point preferably coaxial with the cable lever support shaft 168 when the servo valve spool is in the neutral position. The other end 181 of the valve link 178 is pinned to one end of a spring loaded follow-up rod 182 which is contractible under compression overload and connects to a horn 183 that is firmly attached to the upper rudder 150, and projects forwardly and slightly downwardly from the hinge axis A.

In the closed position of the rudder flaps, the follow-up rod 182 is not on a straight line with the hinge axis A, but is nearly so, the extended center line C of the follow-up rod 182 passing slightly beneath the hinge axis A.

When drag rudders are used, it is customary to connect the rudders on one wing tip to only its own operating pedal in order that both rudders may be opened up simultaneously to obtain bilateral drag. Hence, each pedal must be provided with a separate spring or the like, to return the pedal to neutral.

In operation, when one rudder pedal is pushed by the pilot, the cable lever 167 connected to that pedal rotates clockwise, as viewed from above, about its support shaft 168, displacing the link pin connection 171 to the right. This rotates the valve link 178 about the forward end of the follow-up rod 182, which is yet stationary, and moves the spool rod 179 toward the servo valve 162, admitting fluid pressure to the proper end of the actuating cylinder 152, to separate the rudders 150 and 151. As the upper rudder 150 rotates about its hinge axis A, the horn 183 moves downwardly and to the rear, also about the same hinge axis A. The follow-up rod 182 is thus pulled to the rear, and now the valve link 178 pivots about the link pin connection 171, which is stationary while the pedal is being held down. The valve link 178, driven by the follow-up rod 182, returns the valve spool to its neutral position, stopping the rudder surface movement. The servo valve 162 is now closed and the rudders are held in some open position until subsequent movement of the cable lever 167. In a manner similar to that described, any surface position can be obtained by the proper amount of pedal displacement.

As the rod 182 and horn 183 are nearly in alignment at the beginning of rudder flap movement, the feedback travel of rod 182 and connected valve spool will be small during the initial movement of the rudder surfaces. Thus the rudder surfaces will separate a substantial distance before shutting off flow in valve 162. However, after the rudder surfaces have opened a substantial distance, the angle of horn 183 with rod 182 approaches 90° and the follow-up response approaches linearity. Thus, for a given movement of the rudder pedal, movement of the rudder surfaces is greater near the closed position than near the open position thereof.

This non-linearity is used to make the aerodynamic response of the surfaces substantially linear with movement of the rudder pedal. In the XB-35 airplane described above, the aerodynamic response to rudder flap separation is small until the flaps are separated about 4 inches at their trailing edges. This initial separation can be made to take place with a very small pedal movement by use of the linkage described above.

As each rudder pedal is moved by pilot applied force in one direction only, i. e. to pivot the lever 167 clockwise, follow-up rod 182 need by spring loaded in one direction only, i. e. contractible but not expansible under overload. Hence, if a valve spool is jammed so that the rod 179 is stationary, the follow-up rod 182 will yield, i. e. contract under pilot force tending to move the pivot 171, and so prevent the application of undue force to the valve spool. Likewise, when no hydraulic pressure is present and the valve spool bottoms under pilot force, yielding of the follow-up rod 182 prevents the application of undue force to the valve spool, which undue force might damage the same. In addition, the spring loaded rod will, particularly when used on rudders of the split-flap type described herein, permit the surfaces to be forced back toward the closed position by air loads applied thereon when, for example, it would be dangerous for the surfaces to be fully separated, as at high speed. This safety feature is accomplished by regulating the maximum applied hydraulic force to a figure where safe airloads on the surfaces cannot be exceeded. Under these circumstances, at this airload, the surfaces will not open further. If however, the pilot should hold his valve wide open, and the airload should close the surfaces, the resulting movement of the follow-up rod 182, acting through the link 178, might cause the rod 179 to move sufficiently to bottom the valve spool in the valve 162. Under these circumstances, continued closing movement of the surfaces would transmit their closing airload, except that counteracted by hydraulic pressure, back to the pilot were it not for yielding of the follow-up rod. The spring in this rod 182 preferably will compress upon an applied load of about 85 lbs. to limit the forces possible of transmission to the pilot to about such value.

While the present invention has been described as being applied to the control of various surfaces in airplanes of the all-wing type, it obviously can be utilized for the control of any airplane control surface where the aerodynamic restoring forces are large and where the aerodynamic response is either substantially linear or non-linear with surface movement. In either case, the aerodynamic response can be made substantially linearly related to movements of the pilot's control element.

From the above description, it will also be clearly seen that the present invention makes possible the full power operation of airplane control surfaces irrespective of size of aerodynamic resistance to motion. There is no feed-back of any kind from surface to pilot. The operation of the hydraulic cylinder requires only a few pounds of pilot effort, little more, in fact, than that required to overcome the overall resistance of the cable system and the control neutralizing system. Neutralization of the controls is performed by balanced elastic forces at the pilot's location and the overall pilot effort for normal piloting is small, irrespective of control surface area and aerodynamic forces exerted thereon. The control forces may be made any desired magnitude or made to vary in most any desired manner. They may be altered with ease after the airplane is flown. Since the control forces can be made any desired magnitude, a control stick rather than a column and wheel becomes possible even on large airplanes, thus simplifying cockpit design and improving instrument visibility.

As the control cables carry only friction forces and are used to transmit a signal rather than a force, the cables may be very small in diameter with resulting decrease in friction, weight, and sensitivity to temperature changes.

A number of other advantages will be apparent to those skilled in the art. For example, trimming through the full range of surface travel is easily accomplished and can be done without loss of surface power that would normally result from the displacement of a tab, and emergency flight control and ground control locks become unnecessary.

In addition, the present invention permits the use of one surface to accomplish landing flap, dive brake, and aileron functions, for example, since erratically varying hinge movements will not cause erratic control forces.

Again, because of the relative simplicity as compared to a power boost system, the fully powered system of the present invention is less vulnerable to damage in military use, and maintenance problems are reduced.

Reference has been made herein to the pilot of the airplane as being human. Obviously, however, when automatic piloting devices are used to take over control column movements, no difference in results obtained by the present invention will be found. Thus, the term "pilot" as used in the appended claims will be deemed to include both human pilot and/or automatic pilot devices. In fact, the low and uniform control forces required for full power operation of large control surfaces, as described herein, makes the system readily adaptable to control by automatic pilot mechanisms and the same power units can be used for normal and auto-pilot movement of the surfaces.

I claim:

1. In an aircraft having a movable flight control surface, the combination of a full powered system for operating the surface, said system comprising: a hydraulic motor including a cylinder element and a piston element, one of said elements being connected to the aircraft airframe and the other to the surface for moving the latter by operation of said motor; a control valve connected to said motor, including a casing member and a valve member movable therein from a relative neutral position for admitting fluid from a source of constant pressure to said cylinder element on alternate sides of said piston element, while exhausting fluid from said cylinder element on the opposite alternate sides of said piston element; means connecting one of said members to the control surface for movement thereby in a direction to reposition said members in their relative neutral position when said valve is operated to cause said motor to move the control surface; pilot-controlled means for moving said valve member; and means in said valve effective in the neutral position of said members to define restricted flow ports for admitting pressure fluid equally to, while simultaneously exhausting fluid equally from, said cylinder element on both sides of said piston element, said ports being proportioned to provide pressure drops therethrough that will maintain pressure on both sides of said piston element at least as great as about half that of said constant pressure source.

2. The structure defined in claim 1, wherein both the cylinder element and the valve casing member are connected to the control surface for movement therewith, and the piston element is connected to the airframe.

3. The structure defined in claim 1, wherein the valve member is connected to the control surface for movement thereby in opposition to movement by the pilot-controlled means.

4. The structure defined in claim 1, wherein the valve member is connected to the control surface for non-linear movement thereby in opposition to movement by the pilot-controlled means.

5. The structure defined in claim 1, including means applying opposed elastic forces to the pilot-controlled means for urging said last-mentioned means to a neutral position corresponding to a neutral position of the flight control surface.

6. In an aircraft having a movable flight control surface, the combination of a full powered system for operating the surface, said system comprising: a hydraulic motor including a cylinder element and a piston element, one of said elements being connected to the aircraft airframe and the other to the surface for moving the latter by operation of said motor; a control valve connected to said motor, including a casing member and a valve member movable therein from a relative neutral position for admitting fluid from a source of constant pressure to said cylinder element on alternate sides of said piston element, while exhausting fluid from said cylinder element on the opposite alternate sides of said piston element; means connecting one of said members to the control surface for movement thereby in a direction to reposition said members in their relative neutral position when said valve is operated to cause said motor to move the control surface; pilot-controlled means for moving said valve member; and means in said valve effective in the neutral position of said members to define restricted flow areas for admitting pressure fluid equally to, while simultaneously exhausting fluid equally from, said cylinder element on both sides of said piston element, said areas being proportioned to provide pressure drops therethrough that will maintain pressure on both sides of said piston element at least as great as about half that of said constant pressure source, slight movement of said valve member from the neutral position serving to close the flow area admitting fluid to one side of said piston element and to enlarge the flow area admitting fluid to the other side of said piston element, and continued movement of said valve member in the same direction serving to continue to enlarge the effective flow area for admitting fluid to said other side of said piston element.

7. The structure defined in claim 1 in which the valve member is hydraulically balanced.

8. The structure defined in claim 1 wherein both the cylinder element and the valve casing member are connected to the control surface for movement therewith, the piston element is connected to the airframe, and the pilot-controlled means includes a force-transmitting rod that is expansible and contractible under a predetermined overload.

THOMAS A. FEENEY.

References Cited in the file of this patent

UNITED STATES PATENTS

| Number | Name | Date |
|--------|------|------|
| 1,928,144 | Vickers | Sept. 26, 1933 |
| 2,022,698 | Vickers | Dec. 3, 1935 |
| 2,373,575 | Lemonier | Apr. 10, 1945 |
| 2,424,901 | Richolt | July 29, 1947 |